US012568453B2

(12) United States Patent
Zhang et al.

(10) Patent No.: US 12,568,453 B2
(45) Date of Patent: Mar. 3, 2026

(54) RSS MEASUREMENT METHOD AND APPARATUS, AND SYSTEM

(71) Applicant: Huawei Technologies Co., Ltd., Shenzhen (CN)

(72) Inventors: Li Zhang, Beijing (CN); Jiantao Xue, Beijing (CN); Jing Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 360 days.

(21) Appl. No.: 18/304,717

(22) Filed: Apr. 21, 2023

(65) Prior Publication Data

US 2023/0262628 A1 Aug. 17, 2023

Related U.S. Application Data

(63) Continuation of application No. PCT/CN2020/123426, filed on Oct. 23, 2020.

(51) Int. Cl.
*H04W 56/00* (2009.01)

(52) U.S. Cl.
CPC ..... *H04W 56/0015* (2013.01); *H04W 56/006* (2013.01)

(58) Field of Classification Search
CPC .. H04L 5/0032; H04L 5/0048; H04W 56/001; H04W 56/0015; H04W 56/006
USPC ......................................................... 370/329
See application file for complete search history.

(56) References Cited

U.S. PATENT DOCUMENTS

| | | | |
|---|---|---|---|
| 2010/0298001 A1 | 11/2010 | Dimou et al. | |
| 2021/0306888 A1* | 9/2021 | Kim | H04W 24/08 |
| 2022/0338139 A1* | 10/2022 | Takeda | H04L 5/001 |
| 2022/0346043 A1* | 10/2022 | Takeda | H04W 56/0015 |
| 2022/0346047 A1* | 10/2022 | Takeda | H04W 56/0035 |
| 2023/0217328 A1* | 7/2023 | Wong | H04W 36/0085 370/331 |
| 2024/0137792 A1* | 4/2024 | Åström | H04W 36/0094 |

FOREIGN PATENT DOCUMENTS

| | | |
|---|---|---|
| CN | 103391530 A | 11/2013 |
| CN | 107580791 A | 1/2018 |
| CN | 109964142 A | 7/2019 |
| CN | 111092702 A | 5/2020 |
| WO | 2020167233 A1 | 8/2020 |

OTHER PUBLICATIONS

3GPP TS 36.133 V16.7.0 (Sep. 2020), 3rd Generation Partnership Project; Technical Specification Group Radio Access Network; Evolved Universal Terrestrial Radio Access (E-UTRA); Requirements for support of radio resource management (Release 16), 3122 pages.

(Continued)

*Primary Examiner* — Robert J Lopata
(74) *Attorney, Agent, or Firm* — Slater Matsil, LLP

(57) ABSTRACT

A terminal device determines the time domain location, where the time domain location is a time domain location of the RSS of the neighbor cell in the timing of the neighbor cell; determines a first sequence parameter of the RSS of the neighbor cell; and measures the RSS of the neighbor cell based on the time domain location and the first sequence parameter of the RSS of the neighbor cell.

20 Claims, 5 Drawing Sheets

(56)           References Cited

OTHER PUBLICATIONS

3GPP TS 36.211 V16.2.0 (Jun. 2020), 3rd Generation Partnership Project; Technical Specification Group Radio Access Network; Evolved Universal Terrestrial Radio Access (E-UTRA); Physical channels and modulation (Release 16), 248 pages.
3GPP TS 36.331 V16.1.1 (Jul. 2020), 3rd Generation Partnership Project; Technical Specification Group Radio Access Network; Evolved Universal Terrestrial Radio Access (E-UTRA); Radio Resource Control (RRC); Protocol specification (Release 16), 1078 pages.
3GPP TSG RAN WG1 Meeting #94bis, R1-1810239, "Discussion on the use of RSS for measurement improvement," LG Electronics, Oct. 8-12, 2018, total 8 pages.
Sony, "Considerations on using RSS for measurements", 3GPP TSG RAN WG1 Meeting #94-bis, R1-1810655, Chengdu, China, Oct. 8-12, 2018, XP051518061, 3 pages.
Sony (Updated revision R2-1805163), "RSS and WUS aspects on mobility", 3GPP TSG-RAN WG2 Meeting #102, R2-1807948, Busan, Korea, May 21-25, 2018, XP051464230, 3 pages.

* cited by examiner

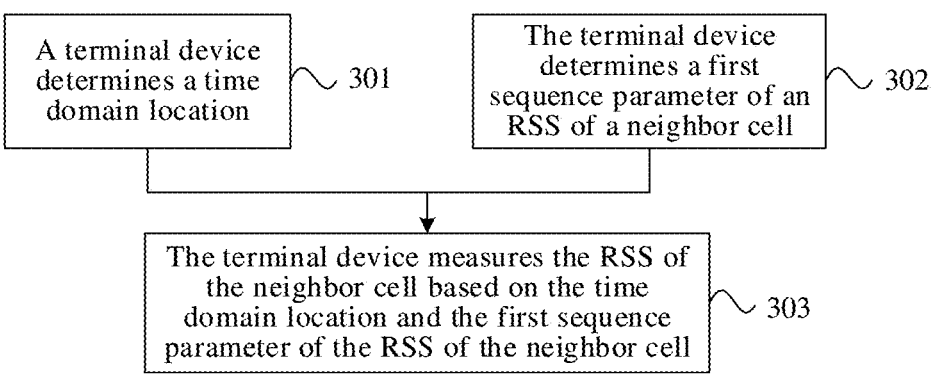

A terminal device determines a time domain location ⌇ 301

The terminal device determines a first sequence parameter of an RSS of a neighbor cell ⌇ 302

The terminal device measures the RSS of the neighbor cell based on the time domain location and the first sequence parameter of the RSS of the neighbor cell ⌇ 303

FIG. 3

Network device

Terminal device

301A: First RSS configuration information of a neighbor cell

301B

The terminal device receives, in a serving cell, the first RSS configuration information sent by the network device

301D ⌇ 301

The terminal device determines a time domain location according to a first preset rule

301C

The terminal device determines a time domain location based on first information The terminal device determines a first sequence parameter of an RSS of the neighbor cell ⌇ 302

The terminal device measures the RSS of the neighbor cell based on the time domain location and the first sequence parameter of the RSS of the neighbor cell ⌇ 303

FIG. 4

RSS MEASUREMENT METHOD AND APPARATUS, AND SYSTEM

CROSS-REFERENCE TO RELATED APPLICATIONS

This application is a continuation of International Application No. PCT/CN2020/123426, filed on Oct. 23, 2020, the disclosure of which is hereby incorporated by reference in its entirety.

TECHNICAL FIELD

This application relates to the field of communication technologies, and in particular, to a re-synchronization signal (RSS) measurement method and apparatus, and a system.

BACKGROUND

Radio resource management (RRM) measurement is measurement performed by a terminal device to assist in mobility management (for example, handover or reselection of the terminal device). The RRM measurement may include reference signal received power (RSRP) measurement. In enhanced machine type communication (eMTC), the terminal device may perform RSRP measurement of a cell by measuring an RSS of the cell.

However, in some cases, for example, when a serving cell is asynchronous with a neighbor cell, the terminal device cannot measure an RSS of the neighbor cell. As a result, an RSRP of the neighbor cell cannot be measured by measuring the RSS of the neighbor cell, and communication reliability is reduced.

SUMMARY

This application provides an RSS measurement method and apparatus, and a system, to resolve a problem that a terminal device cannot measure an RSS of a neighbor cell.

To achieve the foregoing objective, this application uses the following technical solutions.

According to a first aspect, this application provides an RSS measurement method. A terminal device determines a time domain location, where the time domain location is a time domain location of an RSS of a neighbor cell in timing of the neighbor cell, and determines a first sequence parameter of the RSS of the neighbor cell. Then, the terminal device measures the RSS of the neighbor cell based on the time domain location and the first sequence parameter of the RSS of the neighbor cell.

In this way, the terminal device can determine the time domain location of the RSS of the neighbor cell in the timing of the neighbor cell and the first sequence parameter of the RSS of the neighbor cell, so that the RSS of the neighbor cell can be measured based on the time domain location and the first sequence parameter of the RSS of the neighbor cell. This resolves a problem that the terminal device cannot measure the RSS of the neighbor cell. Especially, when a serving cell is asynchronous with the neighbor cell, the terminal device can measure the RSS of the neighbor cell. The RSS of the neighbor cell is accurately measured, so that it is possible to further measure an RSRP of the neighbor cell, and therefore, a basis is provided for the terminal device to subsequently perform cell reselection or measurement reporting.

Optionally, in a possible implementation of this application, the time domain location includes at least one of the following: a frame in which the RSS of the neighbor cell is located and a subframe in which the RSS of the neighbor cell is located.

Optionally, in another possible implementation of this application, the method for "determining a time domain location" may include: The terminal device receives, in the serving cell, first RSS configuration information of the neighbor cell, where the first RSS configuration information carries first information indicating the time domain location; and the terminal device determines the time domain location based on the first information. Alternatively, the terminal device determines the time domain location according to a first preset rule.

In this way, the terminal device may determine the time domain location in either of the foregoing two manners. Alternatively, the terminal device may first determine, based on the first RSS configuration information, whether the time domain location can be determined. If the time domain location can be determined, the time domain location is directly determined based on the first RSS configuration information. If the time domain location cannot be determined, the terminal device determines the time domain location according to the first preset rule.

The terminal device can determine, by using a configuration of a network device or the first preset rule, a frame of the RSS of the neighbor cell in the timing of the neighbor cell or the subframe in which the RSS of the neighbor cell is located. In a manner in which the frame or the subframe in which the RSS of the neighbor cell is located is determined by using the configuration of the network device, different time domain locations of the RSS can be configured for cells, and this improves network flexibility. In a manner in which the frame or the subframe in which the RSS of the neighbor cell is located is determined according to the first preset rule, the frame or the subframe in which the RSS of the neighbor cell is located in the timing of the neighbor cell can be determined without adding additional signaling, and this effectively saves system resources.

Optionally, in another possible implementation of this application, when the first information includes information indicating a target frame in a frame that overlaps with a first frame and that is of the RSS of the neighbor cell in the timing of the neighbor cell, and the first frame is a frame of the RSS of the neighbor cell in timing of the serving cell, the method for "determining the time domain location based on the first information" may include: The terminal device determines the frame in which the RSS of the neighbor cell is located as the target frame. Because the timing of the neighbor cell may be different from timing of the serving cell, in the timing of the neighbor cell, the RSS of the neighbor cell may have at least one frame that overlaps with the first frame. For example, two frames may overlap with the first frame. In this case, the first information indicates which frame in the two frames is the target frame.

Optionally, in another possible implementation of this application, when the first information includes information indicating a configuration of a bandwidth limited/coverage enhanced (BL/CE) subframe of the neighbor cell, the method for "determining the time domain location based on the first information" may include: The terminal device determines the subframe in which the RSS of the neighbor cell is located as a BL/CE subframe in the frame in which the RSS of the neighbor cell is located.

Optionally, in another possible implementation of this application, when the first information includes information indicating a target frame in a frame that overlaps with a first frame and that is of the RSS of the neighbor cell in the timing of the neighbor cell and information indicating a configuration of a BL/CE subframe of the neighbor cell, and the first frame is a frame of the RSS of the neighbor cell in timing of the serving cell, the method for "determining the time domain location based on the first information" may include: The terminal device determines the frame in which the RSS of the neighbor cell is located as the target frame, and determines the subframe in which the RSS of the neighbor cell is located as a BL/CE subframe in the target frame.

Optionally, in another possible implementation of this application, when the time domain location includes the frame in which the RSS of the neighbor cell is located, the method for "determining the time domain location according to a first preset rule" may include: The terminal device determines a frame, in the timing of the neighbor cell, closest to a first frame as the frame in which the RSS of the neighbor cell is located, where the first frame is determined based on second RSS configuration information of the neighbor cell.

Optionally, in another possible implementation of this application, when the time domain location includes the subframe in which the RSS of the neighbor cell is located, the method for "determining the time domain location according to a first preset rule" may include: The terminal device determines a BL/CE subframe that is in the frame in which the RSS of the neighbor cell is located and that has a same configuration as a BL/CE subframe of the serving cell as the subframe in which the RSS of the neighbor cell is located.

Optionally, in another possible implementation of this application, when the time domain location includes the frame in which the RSS of the neighbor cell is located and the subframe in which the RSS of the neighbor cell is located, the method for "determining the time domain location according to a first preset rule" may include: The terminal device determines a frame, in the timing of the neighbor cell, closest to a first frame as the frame in which the RSS of the neighbor cell is located, where the first frame is determined based on second RSS configuration information of the neighbor cell; and the terminal device determines a BL/CE subframe that is in the frame in which the RSS of the neighbor cell is located and that has a same configuration as a BL/CE subframe of the serving cell as the subframe in which the RSS of the neighbor cell is located.

Optionally, in another possible implementation of this application, the method for "determining a first sequence parameter of the RSS of the neighbor cell" may include: The terminal device receives, in the serving cell, third RSS configuration information of the neighbor cell, where the third RSS configuration information carries second information indicating the first sequence parameter of the RSS of the neighbor cell; and the terminal device determines the first sequence parameter of the RSS of the neighbor cell based on the second information. Alternatively, the terminal device determines the first sequence parameter of the RSS of the neighbor cell according to a second preset rule.

The terminal device can determine the first sequence parameter of the RSS of the neighbor cell by using the configuration of the network device or the second preset rule. In a manner of determining the first sequence parameter of the RSS of the neighbor cell by using the configuration of the network device, it is ensured that the terminal device can still correctly measure the RSS of the neighbor cell when different first sequence parameters of the RSS are configured for the cells. In a manner of determining the first sequence parameter of the RSS of the neighbor cell according to the second preset rule, a value of the first sequence parameter can be determined without adding additional signaling.

Optionally, in another possible implementation of this application, the method for "determining the first sequence parameter of the RSS of the neighbor cell according to a second preset rule" may include: The terminal device determines a first sequence parameter of an RSS of the serving cell as the first sequence parameter of the RSS of the neighbor cell.

Optionally, in another possible implementation of this application, the RSS measurement method provided in this application may further include: The terminal device obtains a first reference signal received power (RSRP) of the neighbor cell based on a measurement result of measuring the RSS of the neighbor cell. In addition, the terminal device measures an RSS of a serving cell and obtains a second RSRP of the serving cell based on a measurement result of measuring the RSS of the serving cell. Then, the terminal device performs cell reselection or measurement reporting based on the first RSRP and the second RSRP.

The terminal may obtain an RSRP and reference signal received quality (reference signal received quality, RSRQ) of a cell by measuring a CRS of the cell, to perform the cell reselection or the measurement reporting based on an RSRP and RSRQ of the neighbor cell and an RSRP and RSRQ of the serving cell. When a specified condition is met, cell measurement is performed based on the RSS. In this case, the cell reselection or the measurement reporting may be performed only based on the RSPR, and an effect of RSRP measurement based on the RSS is better than an effect of RSRP measurement based on the CRS.

Optionally, in another possible implementation of this application, the RSS measurement method provided in this application may further include: The terminal device performs a modulo operation on a periodicity of the RSS of the neighbor cell by using a target value, and determines a result of the modulo operation as a frame number of a first frame. The target value is determined based on second RSS configuration information that is of the neighbor cell and that is received in a serving cell, and the first frame is a frame of the RSS of the neighbor cell in timing of the serving cell. By performing the modulo operation, a range of the calculated frame number will not exceed a range of the RSS periodicity of the neighbor cell.

According to a second aspect, this application provides an RSS measurement apparatus. The RSS measurement apparatus includes modules configured to perform the RSS measurement method according to any one of the first aspect or the possible implementations of the first aspect.

According to a third aspect, this application provides an RSS measurement apparatus, where the RSS measurement apparatus includes a memory and a processor. The memory is coupled to the processor. The memory is configured to store computer program code, and the computer program code includes computer instructions. When the processor executes the computer instructions, the RSS measurement apparatus performs the RSS measurement method according to any one of the first aspect and the possible implementations of the first aspect.

According to a fourth aspect, this application provides a chip system, and the chip system is used in an RSS measurement apparatus. The chip system includes one or more interface circuits and one or more processors. The interface circuit and the processor are interconnected through a cable. The interface circuit is configured to: receive a signal from a memory of the RSS measurement apparatus; and send a signal to the processor, where the signal includes computer instructions stored in the memory. When the processor executes the computer instructions, the RSS measurement apparatus performs the RSS measurement method according to any one of the first aspect and the possible implementations of the first aspect.

According to a fifth aspect, this application provides a computer-readable storage medium. The computer-readable storage medium includes computer instructions. When the computer instructions are run on an RSS measurement apparatus, the RSS measurement apparatus is enabled to perform the RSS measurement method according to any one of the first aspect and the possible implementations of the first aspect.

According to a sixth aspect, this application provides a computer program product. The computer program product includes computer instructions. When the computer instructions are run on an RSS measurement apparatus, the RSS measurement apparatus is enabled to perform the RSS measurement method according to any one of the first aspect and the possible implementations of the first aspect.

For detailed descriptions of the second aspect to the sixth aspect and various implementations thereof in this application, refer to detailed descriptions of the first aspect and the various implementations thereof. In addition, for beneficial effects of the second aspect to the sixth aspect and the various implementations thereof, refer to the analysis of beneficial effects of the first aspect and the various implementations thereof. Details are not described herein again.

According to a seventh aspect, this application provides an RSS measurement method. A network device determines first RSS configuration information of a neighbor cell, and sends the first RSS configuration information. The first RSS configuration information carries first information. The first information indicates to determine a time domain location of an RSS of the neighbor cell in timing of the neighbor cell.

In this way, in a manner in which the network device sends the first RSS configuration information to a terminal device, so that the terminal device determines, based on a configuration of the network device, a frame or a subframe in which the RSS of the neighbor cell is located, different time domain locations of the RSS can be configured for cells, and this improves network flexibility.

Optionally, in a possible implementation of this application, the time domain location includes at least one of the following: a frame in which the RSS of the neighbor cell is located and a subframe in which the RSS of the neighbor cell is located.

Optionally, in another possible implementation of this application, when the first information includes information indicating a target frame in a frame that overlaps with a first frame and that is of the RSS of the neighbor cell in the timing of the neighbor cell, the first information indicates to determine the frame in which the RSS of the neighbor cell is located as the target frame. The first frame is a frame of the RSS of the neighbor cell in timing of a serving cell.

Optionally, in another possible implementation of this application, when the first information includes information indicating a configuration of a BL/CE subframe of the neighbor cell, the first information indicates to determine the subframe in which the RSS of the neighbor cell is located as a BL/CE subframe in the frame in which the RSS of the neighbor cell is located.

Optionally, in another possible implementation of this application, when the first information includes information indicating a target frame in a frame that overlaps with a first frame and that is of the RSS of the neighbor cell in the timing of the neighbor cell and information indicating a configuration of a BL/CE subframe of the neighbor cell, the first information indicates to determine the frame in which the RSS of the neighbor cell is located as the target frame and the subframe in which the RSS of the neighbor cell is located as a BL/CE subframe in the target frame. The first frame is a frame of the RSS of the neighbor cell in timing of a serving cell.

Optionally, in another possible implementation of this application, the RSS measurement method provided in this application may further include: The network device determines third RSS configuration information of the neighbor cell, and sends the third RSS configuration information. The third RSS configuration information carries second information, and the second information indicates to determine a first sequence parameter of the RSS of the neighbor cell.

In this way, in a manner in which the network device sends the third RSS configuration information to the terminal device, so that the terminal device determines the first sequence parameter of the RSS of the neighbor cell based on the configuration of the network device, it is ensured that the terminal device can still correctly measure the RSS of the neighbor cell when different first sequence parameters of the RSS are configured for the cells.

According to an eighth aspect, this application provides an RSS measurement apparatus. The RSS measurement apparatus includes modules configured to perform the RSS measurement method according to any one of the seventh aspect or the possible implementations of the seventh aspect.

According to a ninth aspect, this application provides an RSS measurement apparatus, where the RSS measurement apparatus includes a memory and a processor. The memory is coupled to the processor. The memory is configured to store computer program code, and the computer program code includes computer instructions. When the processor executes the computer instructions, the RSS measurement apparatus performs the RSS measurement method according to any one of the seventh aspect and the possible implementations of the seventh aspect.

According to a tenth aspect, this application provides a chip system, and the chip system is used in an RSS measurement apparatus. The chip system includes one or more interface circuits and one or more processors. The interface circuit and the processor are interconnected through a cable. The interface circuit is configured to: receive a signal from a memory of the RSS measurement apparatus; and send a signal to the processor, where the signal includes computer instructions stored in the memory. When the processor executes the computer instructions, the RSS measurement apparatus performs the RSS measurement method according to any one of the seventh aspect and the possible implementations of the seventh aspect.

According to an eleventh aspect, this application provides a computer-readable storage medium. The computer-readable storage medium includes computer instructions. When the computer instructions are run on an RSS measurement apparatus, the RSS measurement apparatus is enabled to perform the RSS measurement method according to any one of the seventh aspect and the possible implementations of the seventh aspect.

According to a twelfth aspect, this application provides a computer program product. The computer program product includes computer instructions. When the computer instructions are run on an RSS measurement apparatus, the RSS measurement apparatus is enabled to perform the RSS measurement method according to any one of the seventh aspect and the possible implementations of the seventh aspect.

For detailed descriptions of the eighth aspect to the twelfth aspect and the implementations of the eighth aspect to the twelfth aspect in this application, refer to detailed descriptions of the seventh aspect and the implementations of the seventh aspect. In addition, for beneficial effects of the eighth aspect to the twelfth aspect and the implementations of the eighth aspect to the twelfth aspect, refer to analysis of beneficial effects of the seventh aspect and the implementations of the seventh aspect. Details are not described herein again.

According to a thirteenth aspect, this application provides a communication system. The communication system includes a terminal device that performs the RSS measurement method according to any one of the first aspect and the possible implementations of the first aspect, and a network device that performs the RSS measurement method according to any one of the seventh aspect and the possible implementations of the seventh aspect.

BRIEF DESCRIPTION OF THE DRAWINGS

FIG. 3 is a schematic flowchart 1 of an RSS measurement method according to an embodiment of this application;

FIG. 4 is a schematic flowchart 2 of an RSS measurement method according to an embodiment of this application;

DETAILED DESCRIPTION OF ILLUSTRATIVE EMBODIMENTS

Figure 1:
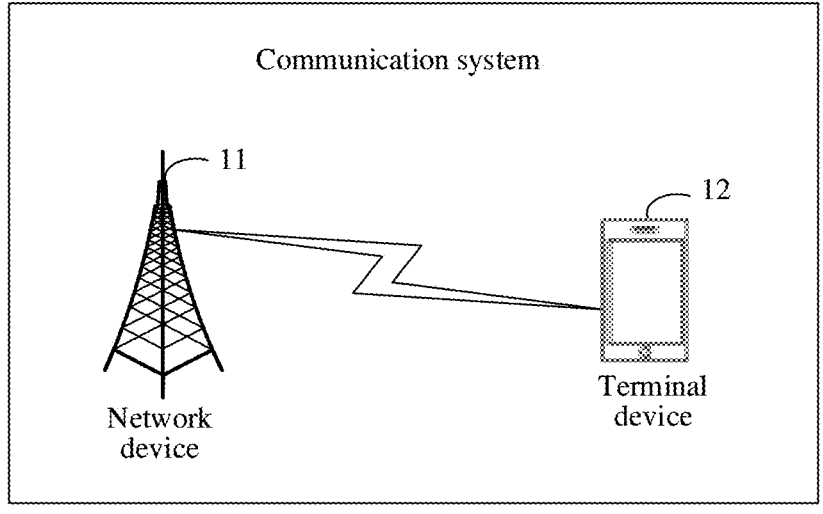
FIG. 1 is a schematic diagram of a structure of a communication system according to an embodiment of this application.

In embodiments of this application, the word such as "for example" is used to represent giving an example, an illustration, or a description. Any embodiment or design scheme described as "for example" in embodiments of this application should not be explained as being more preferred or having more advantages than another embodiment or design scheme. Exactly, use of the word "for example" or the like is intended to present a related concept in a specific manner.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this application, unless otherwise specified, "a plurality of" means two or more than two.

A method for measuring an RSRP of a neighbor cell is implemented based on measuring a cell-specific reference signal (CRS) of the neighbor cell. When measuring the CRS of the neighbor cell, a terminal device needs to first determine a time domain location of the CRS of the neighbor cell. The CRS of the neighbor cell is sent in each subframe. Therefore, the terminal device may measure the CRS of the neighbor cell in any subframe in a transmission resource of the neighbor cell.

With rapid development of communication technologies, RSS-based RSRP measurement is introduced to eMTC in a long term evolution (long term evolution, LTE) system. Compared with the foregoing RSRP measurement by measuring the CRS of the neighbor cell, the RSRP measurement by measuring an RSS of the neighbor cell has advantages of shorter measurement periodicity and higher measurement precision.

When measuring the RSS of the neighbor cell, the terminal device needs to first determine a time domain location of the RSS of the neighbor cell. Because the RSS appears periodically, the terminal device needs to determine a periodicity of the RSS of the neighbor cell and a time domain location at which the RSS of the neighbor cell appears for the first time, to learn of time domain locations of all RSSs of the neighbor cell that appear periodically. Finally, the terminal device obtains the RSRP of the neighbor cell by measuring RSSs of the neighbor cell in a plurality of periodicities.

However, when cells are asynchronous (timing of the neighbor cell is different from timing of a serving cell), the terminal device cannot determine a time domain location of the RSS of the neighbor cell based on the timing of the neighbor cell. This results in a problem that the RSS of the neighbor cell cannot be measured.

In addition, because the terminal device cannot learn of a first sequence parameter of the RSS of the neighbor cell, the terminal device cannot correctly generate a sequence of the RSS of the neighbor cell, and therefore cannot measure the RSS of the neighbor cell.

In conclusion, currently, there is a problem that the terminal device cannot measure the RSS of the neighbor cell.

To resolve the foregoing problem, embodiments of this application provide an RSS measurement method and apparatus, and a system. The terminal device can determine the time domain location of the RSS of the neighbor cell in the timing of the neighbor cell. The terminal device determines the first sequence parameter of the RSS of the neighbor cell. The terminal device measures the RSS of the neighbor cell based on the time domain location and the first sequence parameter of the RSS of the neighbor cell.

The RSS measurement method provided in embodiments of this application is applicable to a communication system. FIG. 1 shows a structure of the communication system. As shown in FIG. 1, the communication system may include a network device 11 and a terminal device 12. The network device 11 and the terminal device 12 establish a connection in a wired communication manner or a wireless communication manner.

The network device 11 is configured to send RSS configuration information (first RSS configuration information, second RSS configuration information, or third RSS configuration information) of a neighbor cell to the terminal device 12.

In some embodiments, the network device 11 is a device that connects the terminal device 12 to a wireless network in the communication system. The network device 11 is a node in a radio access network, may be referred to as a base station, and may also be referred to as a radio access network (RAN) node or device. Currently, for example, the network device 11 may be a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In addition, in a network structure, the network device 11 may include a central unit (CU) node and a distributed unit (DU) node. In this structure, protocol layers of an eNB in an LTE system are split. Functions of some protocol layers are centrally controlled by the CU, functions of some or all of remaining protocol layers are distributed in the DU, and the CU centrally controls the DU.

It should be noted that in this embodiment of this application, a serving cell and the neighbor cell may belong to the same network device 11. Alternatively, a serving cell and the neighbor cell may belong to different network devices. The serving cell belongs to the network device 11, and the neighbor cell belongs to another network device.

The terminal device 12 is configured to receive, in the serving cell, the RSS configuration information of the neighbor cell that is sent by the network device 11. The terminal device 12 is further configured to: determine a time domain location of an RSS of the neighbor cell in timing of the neighbor cell based on the first RSS configuration information or according to a first preset rule, determine a first sequence parameter of the RSS of the neighbor cell based on the third RSS configuration information or according to a second preset rule, and measure the RSS of the neighbor cell based on the time domain location and the first sequence parameter of the RSS of the cell.

In some embodiments, the terminal device 12 may be a mobile terminal device, for example, a mobile phone (or referred to as a "cellular" phone), and a computer that has a mobile terminal device, or may be a portable, pocket-sized, handheld, computer built-in, or in-vehicle mobile apparatus which exchanges voice and/or data with a RAN. For example, the terminal device 12 may be a mobile phone, a tablet computer, a laptop computer, a palmtop computer, a mobile internet device (MID), a wearable device, a virtual reality (VR) device, an augmented reality (AR) device, a wireless terminal device in industrial control, a wireless terminal device in self driving, a wireless terminal device in remote medical surgery, a wireless terminal device in a smart grid, a wireless terminal device in transportation safety, a wireless terminal device in a smart city, or a wireless terminal device in a smart home. In FIG. 1, an example in which the terminal device 12 is a mobile phone is used for illustration.

Figure 2:
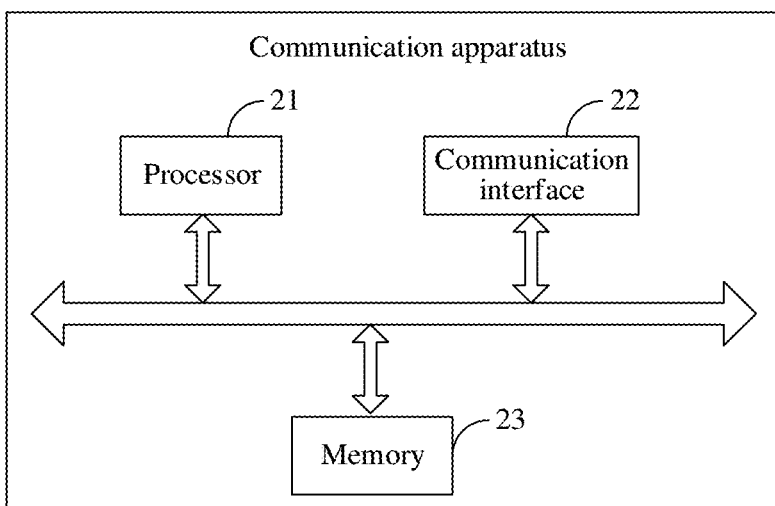
FIG. 2 is a schematic diagram of a structure of a communication apparatus according to an embodiment of this application.

Basic hardware structures of the network device 11 and the terminal device 12 are similar, and both include elements included in a communication apparatus shown in FIG. 2. The following uses the communication apparatus shown in FIG. 2 as an example to describe hardware structures of the network device 11 and the terminal device 12.

As shown in FIG. 2, the communication apparatus may include a processor 21 (or a processing circuit) and a communication interface 22 (or an interface circuit). The communication interface 22 may be configured to communicate with another apparatus or device.

Optionally, the communication apparatus may further include a memory 23, configured to store computer instructions. The processor 21 and the memory 23 are coupled to each other, to implement an RSS measurement method provided in the following embodiments of this application. Alternatively, the communication apparatus may not include a memory 23, and the memory 23 may be located outside the communication apparatus.

The processor 21, the memory 23, and the communication interface 22 are coupled to each other, to implement an RSS measurement method provided in the following embodiments of this application. For example, when the processor 21 executes the computer instructions stored in the memory 23, the communication apparatus is enabled to perform the RSS measurement method provided in the following embodiments of this application. For example, the communication apparatus is a communication device (a terminal device or a network device), or is a chip or another component disposed in the communication device.

If the communication apparatus is the communication device, the communication interface 22 is implemented, for example, as a transceiver (or a transmitter and a receiver) in the communication device, and for example, the transceiver is implemented as an antenna, a feeder, and a codec in the communication device. Alternatively, if the communication apparatus is the chip disposed in the communication device, the communication interface 22 is, for example, an input/output interface such as an input/output pin of the chip, and the communication interface 22 is connected to a radio frequency transceiver component in the communication device, to implement information receiving and sending by using the radio frequency transceiver component.

The processor 21 is a control center of the communication apparatus, and may be one processor or may be a collective name of a plurality of processing elements. For example, the processor 21 may be a general-purpose central processing unit (CPU), or may be another general-purpose processor. The general-purpose processor may be a microprocessor, any conventional processor, or the like. For example, the general-purpose processor may be a graphics processing unit (GPU), a digital signal processor (DSP), or the like.

The memory 22 may be a read-only memory (ROM) or another type of static storage device capable of storing static information and instructions, a random access memory (RAM) or another type of dynamic storage device capable of storing information and instructions, an electrically erasable programmable read-only memory (EEPROM), a magnetic disk storage medium or another magnetic storage device, or any other medium capable of carrying or storing expected program code in a form of an instruction or data structure and capable of being accessed by a computer, but is not limited thereto.

In this embodiment of this application, for the network device 11 and the terminal device 12, software programs stored in the memory 22 are different. Therefore, functions implemented by the network device 11 and the terminal device 12 are different. Functions performed by each device are described with reference to the following flowcharts.

The communication interface 23 is configured to connect the communication apparatus to another device by using a communication network. The communication network may be an Ethernet, a RAN, a wireless local area network (WLAN), or the like. The communication interface 23 may include a receiving unit configured to receive data and a sending unit configured to send data.

It should be noted that a structure shown in FIG. 2 does not constitute a limitation on the communication apparatus.

In addition to the components shown in FIG. 2, the communication apparatus may include more or fewer components than those shown in the figure, or combine some components, or have different component arrangements.

Based on the foregoing descriptions of hardware structures of the communication system and the communication apparatus, embodiments of this application provide an RSS measurement method. The following describes the RSS measurement method provided in embodiments of this application with reference to the accompanying drawings. The RSS measurement method is applied to a scenario in which a terminal device determines, by default, that a periodicity of an RSS of a neighbor cell is the same as a periodicity of an RSS of a serving cell, and determines a time domain location of the RSS of the neighbor cell.

It should be noted that the neighbor cell in embodiments of this application may be a cell that is physically adjacent to the serving cell, or may be a cell that is not physically adjacent to the serving cell. In embodiments of this application, a physical location of the neighbor cell is not limited herein.

When the RSS measurement method is applied to the communication system shown in FIG. 1, as shown in FIG. 3, the RSS measurement method may include the following step 301 to step 303.

301: A terminal device determines a time domain location.

The time domain location is a time domain location of an RSS of a neighbor cell in timing of the neighbor cell. The timing of the neighbor cell is a time reference of a transmission resource of the neighbor cell.

Because the RSS appears periodically, the terminal device may first determine a time domain location at which the RSS of the neighbor cell appears for the first time in the timing of the neighbor cell, so that all time domain locations of the RSS of the neighbor cell in the timing of the neighbor cell can be obtained through calculation based on a periodicity of the RSS of the neighbor cell. The time domain location may include at least one of a frame in which the RSS of the neighbor cell is located or a subframe in which the RSS of the neighbor cell is located.

Specifically, the terminal device may determine, in the following three manners, the time domain location at which the RSS of the neighbor cell appears for the first time in the timing of the neighbor cell.

Manner 1: The time domain location may be determined by the terminal device based on first RSS configuration information of a network device.

Manner 2: The time domain location may be determined by the terminal device according to a first preset rule.

Manner 3: The frame in which the RSS of the neighbor cell is located in the time domain location may be determined by the terminal device by determining whether second RSS configuration information sent by a network device is received. For example, when timing of a serving cell is the same as the timing of the neighbor cell, when receiving the second RSS configuration information, the terminal device may determine a first frame of the RSS of the neighbor cell in the timing of the serving cell based on the second RSS configuration information, and determine a frame that is in the timing of the neighbor cell and that overlaps with the first frame as the frame in which the RSS of the neighbor cell is located. Alternatively, when the terminal device does not receive the second RSS configuration information, the terminal device may obtain a frame of an RSS of a serving cell in timing of the serving cell, and determine a frame that is in the timing of the neighbor cell and that overlaps with the frame as the frame in which the RSS of the neighbor cell is located. The subframe in which the RSS of the neighbor cell is located in the time domain location may be obtained by the terminal device from another channel. For example, the subframe in which the RSS of the neighbor cell is located may be preset in the terminal device, and the terminal device may directly obtain the subframe.

In this embodiment of this application, a specific manner used for determining the time domain location is not limited herein.

302: The terminal device determines a first sequence parameter of the RSS of the neighbor cell.

The first sequence parameter of the RSS of the neighbor cell is a parameter used to generate a sequence of the RSS of the neighbor cell. For example, the first sequence parameter may be u. Optionally, information related to the first sequence parameter may be configured by an information element of systemInfoUnchanged-BR-r15 of the neighbor cell. First sequence parameters of RSSs of different cells may be different.

Specifically, the terminal device may determine the first sequence parameter of the RSS of the neighbor cell in the following three manners.

Manner 1: The first sequence parameter of the RSS of the neighbor cell may be determined by the terminal device based on a third RSS configuration device of the network device.

Manner 2: The first sequence parameter of the RSS of the neighbor cell may be determined by the terminal device according to a second preset rule.

Manner 3: The first sequence parameter of the RSS of the neighbor cell may be obtained by the terminal device from another channel. For example, the first sequence parameter may be preset in the terminal device, and the terminal device may directly obtain the first sequence parameter.

In this embodiment of this application, a specific manner used for determining the first sequence parameter is not limited herein.

It should be noted that, in this embodiment of this application, there is no particular order of performing step 301 and step 302. In other words, the time domain location of the RSS of the neighbor cell in the timing of the neighbor cell and the first sequence parameter of the RSS of the neighbor cell may be determined and obtained by the terminal device at the same time. For example, both are determined and obtained by the terminal device based on configuration information of the network device. For example, both are determined and obtained by using a same piece of configuration information (that is, the first RSS configuration information and the third RSS configuration information are a same piece of configuration information). Alternatively, the time domain location of the RSS of the neighbor cell in the timing of the neighbor cell and the first sequence parameter of the RSS of the neighbor cell may not be determined by the terminal device at the same time. For example, one of the two is determined by the terminal device based on configuration information of the network device, and the other is determined by the terminal device according to a corresponding preset rule. Alternatively, the two are determined by the terminal device respectively according to corresponding preset rules.

In addition, when the terminal device in this embodiment of this application determines the time domain location by using the manner 3 in the foregoing step 301, the terminal device needs to determine the first sequence parameter of the RSS of the neighbor cell by using either the manner 1 or the manner 2 in the foregoing step 302. Similarly, when the terminal device in this embodiment of this application determines the first sequence parameter by using the manner 3 in the foregoing step 302, the terminal device needs to determine the time domain location by using either the manner 1 or the manner 2 in the foregoing step 301. Certainly, the terminal device in this embodiment of this application may alternatively determine the time domain location by using either the manner 1 or the manner 2 in the foregoing step 301, and determine the first sequence parameter by using either the manner 1 or the manner 2 in the foregoing step 302.

303: The terminal device measures the RSS of the neighbor cell based on the time domain location and the first sequence parameter of the RSS of the neighbor cell.

The terminal device may generate the sequence of the RSS of the neighbor cell based on all the time domain locations of the RSS of the neighbor cell in the timing of the neighbor cell and the first sequence parameter of the RSS of the neighbor cell, to measure the RSS of the neighbor cell.

According to the RSS measurement method provided in this embodiment of this application, the terminal device can determine the time domain location of the RSS of the neighbor cell in the timing of the neighbor cell, and determine the first sequence parameter of the RSS of the neighbor cell. Then, the RSS of the neighbor cell is measured based on the time domain location and the first sequence parameter of the RSS of the neighbor cell. This resolves a problem that the terminal device cannot measure the RSS of the neighbor cell. Especially, when the serving cell is asynchronous with the neighbor cell, the terminal device can measure the RSS of the neighbor cell. The RSS of the neighbor cell is accurately measured, so that it is possible to further measure an RSRP of the neighbor cell, and therefore, a basis is provided for the terminal device to subsequently perform cell reselection or measurement reporting.

Optionally, in embodiments of this application, based on FIG. 3, as shown in FIG. 4, when a time domain location is determined and obtained by a terminal device based on first RSS configuration information of a network device, the RSS measurement method provided in embodiments of this application may further include the following step 301A. The foregoing step 301 may specifically include the following step 301B and step 301C.

301A: The network device sends the first RSS configuration information of a neighbor cell to the terminal device.

Specifically, the network device may first determine the first RSS configuration information of the neighbor cell, and then send the first RSS configuration information to the terminal device. The first RSS configuration information carries first information, and the first information indicates to determine a time domain location of an RSS of the neighbor cell in timing of the neighbor cell.

It may be understood that the first information carried in the first RSS configuration information may be determined by the network device in different manners. Specifically, when a serving cell and the neighbor cell belong to a same network device, the network device may directly determine the first information, include the first information in the first RSS configuration information, and send the first RSS configuration information to the terminal device. When a serving cell and the neighbor cell belong to different network devices, the network device to which the serving cell belongs may communicate with the network device to which the neighbor cell belongs, to obtain the first information, include the first information in the first RSS configuration information, and send the first RSS configuration information to the terminal device. In FIG. 4, an example in which the serving cell and the neighbor cell belong to a same network device is shown.

In addition, the first information carried in the first RSS configuration information may be information that directly indicates the time domain location. Alternatively, the first information may be information that indirectly indicates the time domain location. In other words, the time domain location can be obtained only after derivation is performed based on the first information.

301B: The terminal device receives, in the serving cell, the first RSS configuration information sent by the network device.

The terminal device may receive, in the serving cell, the first RSS configuration information from the network device, where the first RSS configuration information carries the first information indicating the time domain location of the RSS of the neighbor cell in the timing of the neighbor cell. The serving cell belongs to the network device.

301C: The terminal device determines the time domain location based on the first information.

When the first information includes information indicating a target frame in a frame that overlaps with a first frame and that is of the RSS of the neighbor cell in the timing of the neighbor cell, that the terminal device determines the time domain location based on the first information may specifically include: The terminal device determines a frame in which the RSS of the neighbor cell is located as the target frame. The first frame is a frame of the RSS of the neighbor cell in timing of the serving cell, namely, a frame in a transmission resource of the serving cell. Because the timing of the neighbor cell may be different from the timing of the serving cell, in the timing of the neighbor cell, the RSS of the neighbor cell may have at least one frame that overlaps with the first frame. For example, two frames may overlap with the first frame. In this case, the first information indicates which frame in the two frames is the target frame.

When the first information includes information indicating a configuration of a BL/CE subframe of the neighbor cell, that the terminal device determines the time domain location based on the first information may specifically include: The terminal device determines a subframe in which the RSS of the neighbor cell is located as a BL/CE subframe in a frame in which the RSS of the neighbor cell is located.

When the first information includes information indicating a target frame in a frame that overlaps with a first frame and that is of the RSS of the neighbor cell in the timing of the neighbor cell and information indicating a configuration of a BL/CE subframe of the neighbor cell, that the terminal device determines the time domain location based on the first information may specifically include: The terminal device determines a frame in which the RSS of the neighbor cell is located as the target frame, and determines a subframe in which the RSS of the neighbor cell is located as a BL/CE subframe in the target frame.

Based on FIG. 3, as shown in FIG. 4, when a time domain location is determined and obtained by a terminal device according to a first preset rule, the foregoing step 301 may specifically include the following step 301D.

301D: The terminal device determines the time domain location according to the first preset rule.

When the time domain location includes a frame in which an RSS of a neighbor cell is located, a process in which the terminal device determines the time domain location according to the first preset rule is: The terminal device may determine a frame of the RSS of the neighbor cell in timing of a serving cell based on second RSS configuration information of the neighbor cell, that is, determine a first frame. The terminal device determines a frame that is in timing of the neighbor cell and that is closest to the first frame as the frame in which the RSS of the neighbor cell is located, or determines a frame that is in timing of the neighbor cell and that has longest overlapping time with the first frame as the frame in which the RSS of the neighbor cell is located.

A process in which the terminal device determines, in the timing of the neighbor cell, the frame closest to the first frame or the frame having the longest overlapping time with the first frame may be as follows: The terminal device first determines, in the timing of the neighbor cell, frames that overlap with the first frame. For these overlapping frames, the terminal device determines a distance between a frame header of each overlapping frame and a frame header of the first frame. Finally, the terminal device determines an overlapping frame corresponding to a minimum distance as the frame closest to the first frame or the frame having the longest overlapping time with the first frame. Certainly, the terminal device may alternatively calculate a distance between a frame trailer of each overlapping frame and a frame trailer of the first frame, and determine an overlapping frame corresponding to a minimum distance as the frame closest to the first frame or the frame having the longest overlapping time with the first frame.

When the time domain location includes a subframe in which an RSS of a neighbor cell is located, a process in which the terminal device determines the time domain location according to the first preset rule is: The terminal device obtains a configuration of a BL/CE subframe of a serving cell, and determines a BL/CE subframe that is in a frame in which the RSS of the neighbor cell is located and that has a same configuration as the BL/CE subframe of the serving cell as the subframe in which the RSS of the neighbor cell is located. In other words, the terminal device assumes that a configuration of a BL/CE subframe of the neighbor cell is the same as the configuration of the BL/CE subframe of the serving cell. In this case, the terminal device meets a requirement for measuring the RSS of the neighbor cell only when an actual configuration of the BL/CE subframe of the neighbor cell is the same as the assumed configuration.

When the time domain location includes a frame in which an RSS of a neighbor cell is located and a subframe in which the RSS of the neighbor cell is located, a process in which the terminal device determines the time domain location according to the first preset rule is: The terminal device may determine a frame, in timing of the neighbor cell, closest to a first frame as the frame in which the RSS of the neighbor cell is located, and the terminal device determines a BL/CE subframe that is in the frame in which the RSS of the neighbor cell is located and that has a same configuration as a BL/CE subframe of a serving cell as the subframe in which the RSS of the neighbor cell is located.

In the conventional technology, when the terminal device determines that the time domain location of the RSS of the neighbor cell based on the timing of the neighbor cell is the same as a time domain location of an RSS of the serving cell based on the timing of the serving cell, or when the terminal device determines, based on a time domain offset, the time domain location of the RSS of the neighbor cell based on the timing of the neighbor cell, the terminal device determines the first frame of the RSS of the neighbor cell in the timing of the serving cell, to determine the frame overlapping with the first frame in the timing of the neighbor cell. In an asynchronous scenario, the terminal device determines two overlapping frames. In this case, the terminal device cannot determine which frame of the two frames is used to send the RSS of the neighbor cell.

Figure 5:
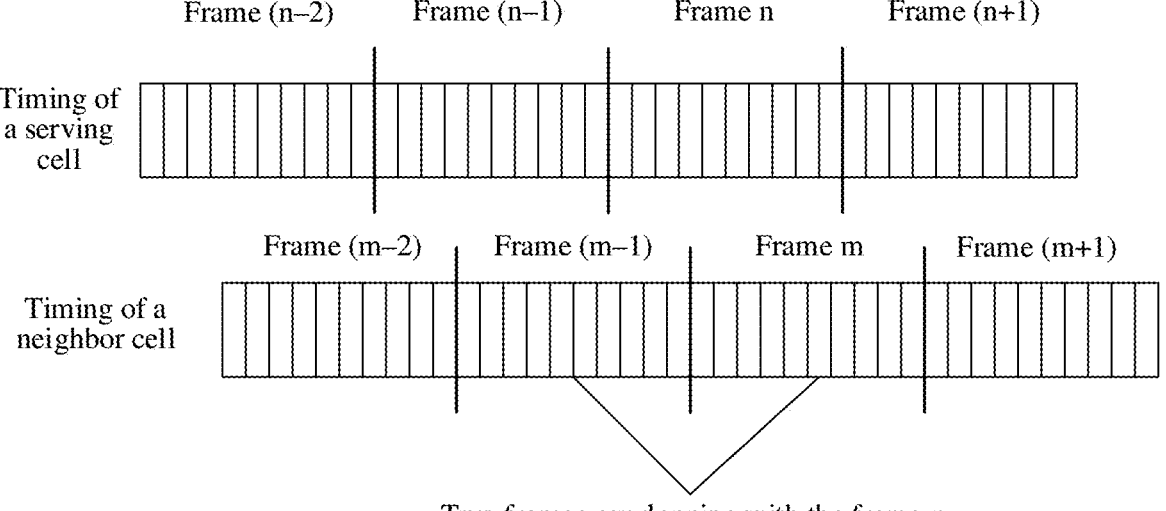
FIG. 5 is a schematic diagram of a time domain location of an RSS of a neighbor cell in timing of the neighbor cell according to an embodiment of this application.

For example, as shown in FIG. 5, it is assumed that the first frame of the RSS of the neighbor cell in the timing of the serving cell is n. In the asynchronous scenario, the terminal device may determine a location of a frame header of a transmission resource of the neighbor cell by detecting a primary/secondary synchronization signal (PSS/SSS) of the neighbor cell. In this case, it can be learned from FIG. 5 that, the terminal device determines, in the timing of the neighbor cell, two frames that overlap with the frame n: a frame (m−1) and a frame m. In this case, the terminal device cannot determine whether the RSS of the neighbor cell is sent in the frame (m−1) or the frame m.

In addition, an existing standard specifies that a start subframe for sending an RSS is the first BL/CE subframe in a frame for sending the RSS. However, currently, the terminal device can learn only a configuration of a BL/CE subframe of the serving cell, and cannot learn a configuration of a BL/CE subframe of the neighbor cell. As a result, a subframe location of the RSS of the neighbor cell in a frame in which the RSS of the neighbor cell is located cannot be determined, and the RSS of the neighbor cell cannot be measured.

In this embodiment of this application, the terminal device can determine, by using a configuration of the network device or the first preset rule, the frame of the RSS of the neighbor cell in the timing of the neighbor cell (where with reference to FIG. 5, the terminal device can determine that the frame in which the RSS of the neighbor cell is located in the timing of the neighbor cell is one of the frame (m−1) and the frame m), or the subframe in which the RSS of the neighbor cell is located. In the manner in which the frame or the subframe in which the RSS of the neighbor cell is located is determined by using the configuration of the network device, different time domain locations of the RSS can be configured for cells, and this improves network flexibility. In the manner in which the frame or the subframe in which the RSS of the neighbor cell is located is determined according to the first preset rule, the frame or the subframe in which the RSS of the neighbor cell is located in the timing of the neighbor cell can be determined without adding additional signaling, and this effectively saves system resources.

Figure 6:
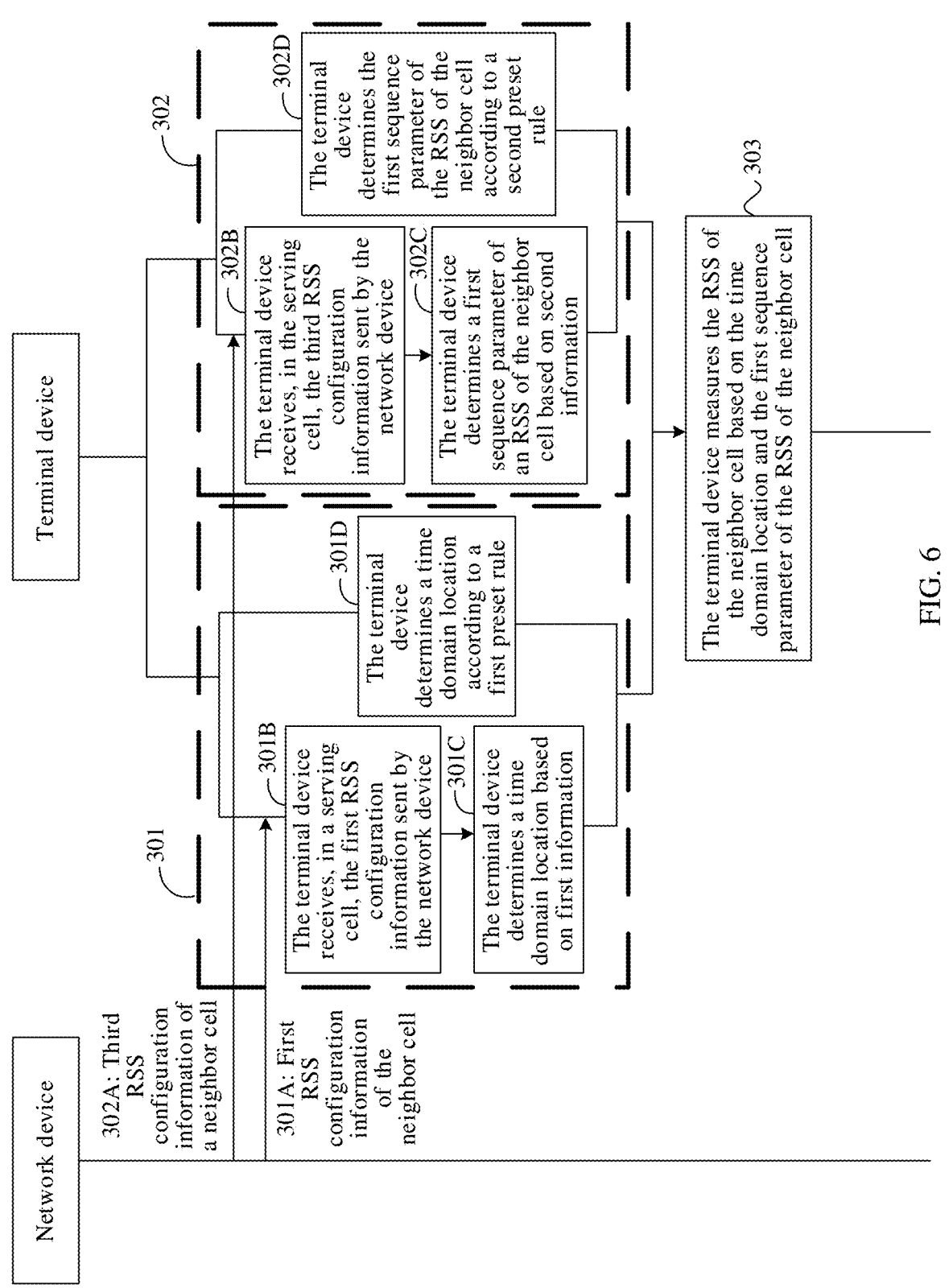
FIG. 6 is a third schematic flowchart of an RSS measurement method according to an embodiment of this application.

Optionally, in embodiments of this application, based on FIG. 4, as shown in FIG. 6, when a first sequence parameter of an RSS of a neighbor cell is determined and obtained by a terminal device based on a configuration of a network device, the RSS measurement method provided in embodiments of this application may further include the following step 302A. The foregoing step 302 may specifically include the following step 302B and step 302C.

302A: The network device sends third RSS configuration information of the neighbor cell to the terminal device.

Specifically, the network device may first determine the third RSS configuration information of the neighbor cell, and then send the third RSS configuration information to the terminal device. The third RSS configuration information carries second information and the second information indicates to determine the first sequence parameter of the RSS of the neighbor cell.

It may be understood that the second information carried in the third RSS configuration information may be obtained by the network device in different manners. For specific descriptions of the manner of obtaining the second information, refer to related descriptions of the manner of obtaining the first information in the foregoing step 301A. Details are not described in this embodiment of this application again.

In addition, the second information carried in the third RSS configuration information may be information that directly indicates the first sequence parameter. Alternatively, the second information may be information that indirectly indicates the first sequence parameter. In other words, the first sequence parameter can be obtained only after derivation is performed based on the second information.

302B: The terminal device receives, in a serving cell, the third RSS configuration information sent by the network device.

The terminal device may receive, in the serving cell, the third RSS configuration information of the neighbor cell from the network device, where the third RSS configuration information carries the second information indicating the first sequence parameter of the RSS of the neighbor cell.

302C: The terminal device determines the first sequence parameter of the RSS of the neighbor cell based on the second information.

Based on FIG. 4, as shown in FIG. 6, when a first sequence parameter of an RSS of a neighbor cell is determined and obtained by a terminal device according to a second preset rule, the foregoing step 302 may specifically include the following step 302D.

302D: The terminal device determines the first sequence parameter of the RSS of the neighbor cell according to the second preset rule.

The terminal device may first obtain a first sequence parameter of an RSS of a serving cell, and then determine the first sequence parameter of the RSS of the serving cell as the first sequence parameter of the RSS of the neighbor cell. In other words, the terminal device may assume that u of the RSS of the neighbor cell has a value of u of the RSS of the serving cell. In this case, the terminal device meets a requirement for measuring the RSS of the neighbor cell only when an actual value of the first sequence parameter of the RSS of the neighbor cell is the same as the assumed value.

Because the terminal device cannot learn of the first sequence parameter of the RSS of the neighbor cell, the terminal device cannot correctly generate a sequence of the RSS of the neighbor cell, and therefore cannot measure the RSS of the neighbor cell.

In this embodiment of this application, the terminal device can determine the first sequence parameter of the RSS of the neighbor cell by using a configuration of the network device or the second preset rule. In the manner of determining the first sequence parameter of the RSS of the neighbor cell by using the configuration of the network device, it is ensured that the terminal device can still correctly measure the RSS of the neighbor cell when different first sequence parameters of the RSS are configured for cells. In the manner of determining the first sequence parameter of the RSS of the neighbor cell according to the second preset rule, a value of the first sequence parameter can be determined without adding additional signaling.

Optionally, in embodiments of this application, after performing the foregoing step 303, the terminal device may obtain a first RSRP of the neighbor cell based on a measurement result of measuring the RSS of the neighbor cell. In addition, the terminal device may measure the RSS of the serving cell based on a time domain location of the RSS of the serving cell in the timing of the serving cell and the first sequence parameter of the RSS of the serving cell, and obtain a second RSRP of the serving cell based on a measurement result of measuring the RSS of the serving cell. Then, the terminal device may perform cell reselection or measurement reporting based on the first RSRP and the second RSRP.

The terminal may obtain an RSRP and reference signal received quality (RSRQ) of a cell by measuring a CRS of the cell, to perform the cell reselection or the measurement reporting based on an RSRP and RSRQ of the neighbor cell and an RSRP and RSRQ of the serving cell. When a specified condition is met, cell measurement is performed based on the RSS. In this case, the cell reselection or the measurement reporting may be performed only based on the RSPR, and an effect of RSRP measurement based on the RSS is better than an effect of RSRP measurement based on the CRS.

It should be noted that a trigger condition for performing the RSS measurement method in embodiments of this application when the terminal device is in a connected mode may be changed. In the conventional technology, when the terminal device receives the second RSS configuration information of the neighbor cell sent by the network device, execution of the RSS measurement method is triggered. In embodiments of this application, the execution of the RSS measurement method is triggered only when the terminal device receives the second RSS configuration information of the neighbor cell sent by the network device, and determines that RSRQ in a measurement reporting configuration sent by the network device is not configured as a reference value for the measurement reporting.

Optionally, in embodiments of this application, when determining the frame of the RSS of the neighbor cell in the timing of the serving cell, that is, determining the first frame, the terminal device may first determine a target value based on the second RSS configuration information that is of the neighbor cell and that is received by the terminal device in the serving cell, then perform a modulo operation on the periodicity of the RSS of the neighbor cell by using the target value, and finally determine a result of the modulo operation as a frame number of the first frame. In this way, a problem that a frame number obtained through direct calculation without performing the modulo operation may exceed a range of the periodicity of the RSS of the neighbor cell is overcome. For example, assuming that the periodicity of the RSS of the neighbor cell is 160 milliseconds, namely, 16 frames, a range of the frame number obtained by the terminal device through calculation should be [0, 1, 2, 3, 4, . . . , 15]. However, the frame number obtained through the direct calculation without performing the modulo operation may be greater than 15. In embodiments of this application, the modulo operation is performed, to effectively avoid a problem that the calculated frame number exceeds the range of the periodicity of the RSS of the neighbor cell.

It may be understood that, the periodicity of the RSS of the neighbor cell is in a unit of frame, and is obtained by dividing the periodicity of the RSS of the neighbor cell (in a unit of millisecond) by 10 (where 10 indicates that a frame is 10 milliseconds).

It should be noted that the RSS configuration information (the first RSS configuration information) that carries the first information, the RSS configuration information (the third RSS configuration information) that carries the second information, and the RSS configuration information (the second RSS configuration information) that is used to determine the first frame in the foregoing embodiments may be a same piece of information, for example, a same piece of RSS configuration information, or may be different pieces of information.

The foregoing mainly describes the solutions provided in embodiments of this application from the perspective of the methods. To implement the foregoing functions, corresponding hardware structures and/or software modules for performing the functions are included. A person skilled in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

Figure 7:
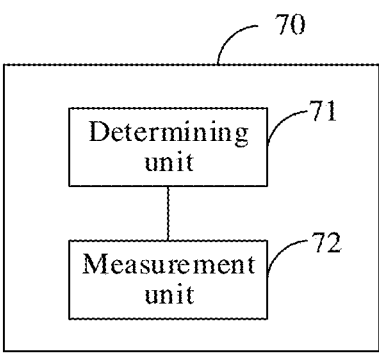
FIG. 7 is a schematic diagram 1 of a structure of an RSS measurement apparatus according to an embodiment of this application.

FIG. 7 is a schematic diagram of a structure of an RSS measurement apparatus 70 according to an embodiment of this application. The RSS measurement apparatus 70 may be a terminal device, a CPU in the terminal device, a control module in the terminal device, or a client in the terminal device. The RSS measurement apparatus 70 is configured to perform the RSS measurement method shown in any one of FIG. 3, FIG. 4, and FIG. 6. The RSS measurement apparatus 70 may include a determining unit 71 and a measurement unit 72.

The determining unit 71 is configured to: determine a time domain location, where the time domain location is a time domain location of an RSS of a neighbor cell in timing of the neighbor cell; and determine a first sequence parameter of the RSS of the neighbor cell. For example, with reference to FIG. 3, the determining unit 71 may be configured to perform step 301 and step 302. The measurement unit 72 is configured to measure the RSS of the neighbor cell based on the time domain location and the first sequence parameter of the RSS of the neighbor cell that are determined by the determining unit 71. For example, with reference to FIG. 3, the measurement unit 72 may be configured to perform step 303.

Optionally, the time domain location includes at least one of the following: a frame in which the RSS of the neighbor cell is located and a subframe in which the RSS of the neighbor cell is located.

Optionally, the determining unit 71 is specifically configured to: receive, in a serving cell, first RSS configuration information of the neighbor cell, where the first RSS configuration information carries first information indicating the time domain location; and determine the time domain location based on the first information; or determine the time domain location according to a first preset rule.

Optionally, the first information includes information indicating a target frame in a frame that overlaps with a first frame and that is of the RSS of the neighbor cell in the timing of the neighbor cell, and the first frame is a frame of the RSS of the neighbor cell in timing of the serving cell. The determining unit 71 is specifically configured to: determine the frame in which the RSS of the neighbor cell is located as the target frame.

Optionally, the first information includes information indicating a configuration of a BL/CE subframe of the neighbor cell. The determining unit 71 is specifically configured to determine the subframe in which the RSS of the neighbor cell is located as a BL/CE subframe in the frame in which the RSS of the neighbor cell is located.

Optionally, the first information includes information indicating a target frame in a frame that overlaps with a first frame and that is of the RSS of the neighbor cell in the timing of the neighbor cell and information indicating a configuration of a BL/CE subframe of the neighbor cell. The determining unit 71 is specifically configured to determine the frame in which the RSS of the neighbor cell is located as the target frame, and determine the subframe in which the RSS of the neighbor cell is located as a BL/CE subframe in the target frame.

Optionally, the time domain location includes the frame in which the RSS of the neighbor cell is located. The determining unit 71 is specifically configured to: determine a frame, in the timing of the neighbor cell, closest to a first frame as the frame in which the RSS of the neighbor cell is located, where the first frame is determined based on second RSS configuration information of the neighbor cell.

Optionally, the time domain location includes the subframe in which the RSS of the neighbor cell is located. The determining unit 71 is specifically configured to determine a BL/CE subframe that is in the frame in which the RSS of the neighbor cell is located and that has a same configuration as a BL/CE subframe of the serving cell as the subframe in which the RSS of the neighbor cell is located.

Optionally, the time domain location includes the frame in which the RSS of the neighbor cell is located and the subframe in which the RSS of the neighbor cell is located. The determining unit 71 is specifically configured to: determine a frame, in the timing of the neighbor cell, closest to a first frame as the frame in which the RSS of the neighbor cell is located, and determine a BL/CE subframe that is in the frame in which the RSS of the neighbor cell is located and that has a same configuration as a BL/CE subframe of the serving cell as the subframe in which the RSS of the neighbor cell is located.

Optionally, the determining unit 71 is specifically configured to: receive, in the serving cell, third RSS configuration information of the neighbor cell, where the third RSS configuration information carries second information indicating the first sequence parameter of the RSS of the neighbor cell; and determine the first sequence parameter of the RSS of the neighbor cell based on the second information; or determine the first sequence parameter of the RSS of the neighbor cell according to a second preset rule.

Optionally, the determining unit 71 is specifically configured to determine a first sequence parameter of an RSS of the serving cell as the first sequence parameter of the RSS of the neighbor cell.

Figure 8:
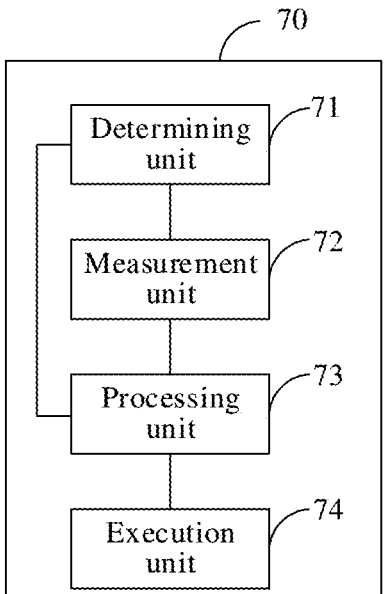
FIG. 8 is a schematic diagram 2 of a structure of an RSS measurement apparatus according to an embodiment of this application.

Optionally, as shown in FIG. 8, the RSS measurement apparatus 70 may further include a processing unit 73 and an execution unit 74.

The processing unit 73 is configured to obtain a first RSRP of the cell based on a measurement result of the RSS of the neighbor cell measured by the measurement unit 72. The measurement unit 72 is further configured to measure an RSS of a serving cell. The processing unit is further configured to obtain a second RSRP of the serving cell based on a measurement result of measuring the RSS of the serving cell by the measurement unit 72. The execution unit is configured to perform cell reselection or measurement reporting based on the first RSRP and the second RSRP that are obtained by the processing unit 73.

Optionally, the processing unit 73 is configured to perform a modulo operation on a periodicity of the RSS of the neighbor cell by using a target value, where the target value is determined based on second RSS configuration information that is of the neighbor cell and that is received in a serving cell. The determining unit 71 is further configured to determine a result of the modulo operation obtained by the processing unit 73 as a frame number of a first frame, where the first frame is a frame of the RSS of the neighbor cell in timing of the serving cell.

Certainly, the RSS measurement apparatus 70 provided in embodiments of this application includes but is not limited to the foregoing modules.

In actual implementation, the determining unit 71, the measurement unit 72, the processing unit 73, and the execution unit 74 may be implemented by the processor of the communication apparatus shown in FIG. 2. The determining unit 71 is configured to determine the time domain location through the communication interface of the communication apparatus shown in FIG. 2. When the communication apparatus is the terminal device, the determining unit 71 is configured to determine the time domain location through a transceiver in the terminal device. When the communication apparatus is a chip in the terminal device, the determining unit 71 is configured to determine the time domain location through an input/output interface of the chip. The measurement unit 72 is configured to implement a measurement function through the communication interface (the transceiver of the terminal device or the input/output interface of the chip in the terminal device) of the communication apparatus shown in FIG. 2. For a specific execution process, refer to the descriptions of the RSS measurement method shown in FIG. 3, FIG. 4, or FIG. 6. Details are not described herein again.

Another embodiment of this application further provides a computer-readable storage medium. The computer-readable storage medium stores computer instructions. When the computer instructions are run on a terminal device, the terminal device is enabled to perform steps performed by the terminal device in the method procedures shown in the foregoing method embodiments.

Another embodiment of this application further provides a chip system, and the chip system is used in a terminal device. The chip system includes one or more interface circuits and one or more processors. The interface circuit and the processor are interconnected through a cable. The interface circuit is configured to receive a signal from a memory of the terminal device, and send the signal to the processor. The signal includes computer instructions stored in the memory. When the processor executes the computer instructions, the terminal device performs steps performed by the terminal device in the method procedures shown in the foregoing method embodiments.

In another embodiment of this application, a computer program product is further provided. The computer program product includes computer instructions, and when the computer instructions are run on a terminal device, the terminal device is enabled to perform steps performed by the terminal device in the method procedures shown in the foregoing method embodiments.

Figure 9:
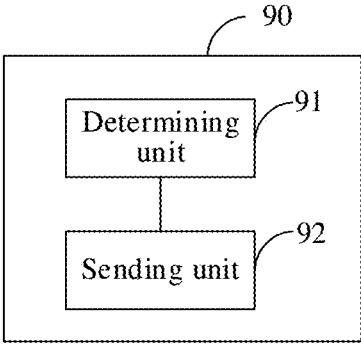
FIG. 9 is a schematic diagram 3 of a structure of an RSS measurement apparatus according to an embodiment of this application.

FIG. 9 is a schematic diagram of a structure of an RSS measurement apparatus 90 according to an embodiment of this application. The RSS measurement apparatus 90 may be a network device, a CPU in the network device, a control module in the network device, or a client in the network device. The RSS measurement apparatus 90 is configured to perform the RSS measurement method shown in any one of FIG. 3, FIG. 4, and FIG. 6. The RSS measurement apparatus 90 may include a determining unit 91 and a sending unit 92.

The determining unit 91 is configured to determine first RSS configuration information of a neighbor cell, where the first RSS configuration information carries first information, and the first information indicates to determine a time domain location of an RSS of the neighbor cell in timing of the neighbor cell. The sending unit 92 is configured to send the first RSS configuration information determined by the determining unit 91. For example, with reference to FIG. 4, the sending unit 92 may be configured to perform step 301A.

Optionally, the time domain location includes at least one of the following: a frame in which the RSS of the neighbor cell is located and a subframe in which the RSS of the neighbor cell is located.

Optionally, when the first information includes information indicating a target frame in a frame that overlaps with a first frame and that is of the RSS of the neighbor cell in the timing of the neighbor cell, the first information indicates to determine the frame in which the RSS of the neighbor cell is located as the target frame; and the first frame is a frame of the RSS of the neighbor cell in timing of a serving cell.

Optionally, when the first information includes information indicating a configuration of a BL/CE subframe of the neighbor cell, the first information indicates to determine the subframe in which the RSS of the neighbor cell is located as a BL/CE subframe in the frame in which the RSS of the neighbor cell is located.

Optionally, when the first information includes information indicating a target frame in a frame that overlaps with a first frame and that is of the RSS of the neighbor cell in the timing of the neighbor cell and information indicating a configuration of a BL/CE subframe of the neighbor cell, the first information indicates to determine the frame in which the RSS of the neighbor cell is located as the target frame and the subframe in which the RSS of the neighbor cell is located as a BL/CE subframe in the target frame.

Optionally, the determining unit 91 is further configured to determine third RSS configuration information of the neighbor cell, where the third RSS configuration information carries second information, and the second information indicates to determine a first sequence parameter of the RSS of the neighbor cell. The sending unit 92 is further configured to send the third RSS configuration information determined by the determining unit 91. For example, with reference to FIG. 6, the sending unit 92 may be configured to perform step 302A.

Certainly, the RSS measurement apparatus 90 provided in embodiments of this application includes but is not limited to the foregoing modules.

In actual implementation, the determining unit 91 may be implemented by the processor of the communication apparatus shown in FIG. 2. The sending unit 92 may be implemented by the communication interface of the communication apparatus shown in FIG. 2. When the communication apparatus is the network device, the sending unit 92 is configured to implement a sending function through a transceiver in the network device. When the communication apparatus is a chip in the network device, the sending unit 92 is configured to implement a sending function through an input/output interface of the chip. For a specific execution process, refer to the descriptions of the RSS measurement method shown in FIG. 3, FIG. 4, or FIG. 6. Details are not described herein again.

Another embodiment of this application further provides a computer-readable storage medium. The computer-readable storage medium stores computer instructions. When the computer instructions are run on a network device, the network device is enabled to perform steps performed by the network device in the method procedures shown in the foregoing method embodiments.

Another embodiment of this application further provides a chip system, and the chip system is used in a network device. The chip system includes one or more interface circuits and one or more processors. The interface circuit and the processor are interconnected through a cable. The interface circuit is configured to receive a signal from a memory of the network device, and send the signal to the processor. The signal includes computer instructions stored in the memory. When the processor executes the computer instructions, the network device performs steps performed by the network device in the method procedures shown in the foregoing method embodiments.

In another embodiment of this application, a computer program product is further provided. The computer program product includes computer instructions, and when the computer instructions are run on a network device, the network device is enabled to perform steps performed by the network device in the method procedures shown in the foregoing method embodiments.

All or a part of the foregoing embodiments may be implemented by software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application. Any variation or replacement readily figured out by a person skilled in the art based on the specific implementations provided in this application shall fall within the protection scope of this application.

What is claimed is:

1. A method, comprising:
   determining a time domain location according to a first preset rule, wherein the time domain location is a time domain location of a re-synchronization signal (RSS) of a neighbor cell in timing of the neighbor cell;
   determining a first sequence parameter of the RSS of the neighbor cell; and
   measuring the RSS of the neighbor cell based on the time domain location and the first sequence parameter of the RSS of the neighbor cell,
   wherein determining the time domain location according to the first preset rule comprises determining a bandwidth limited/coverage enhanced (BL/CE) subframe that is in a frame in which the RSS of the neighbor cell is located and that has a same configuration as a BL/CE subframe of a serving cell as a subframe in which the RSS of the neighbor cell is located.

2. The method according to claim 1, wherein the time domain location comprises the frame in which the RSS of the neighbor cell is located or the subframe in which the RSS of the neighbor cell is located.

3. The method according to claim 1, wherein, before measuring the RSS of the neighbor cell, the method further comprises:
   receiving a second RSS configuration information of the neighbor cell; and
   determining that a reference signal received quality (RSRQ) in a measurement reporting configuration from a network device is not configured as a reference value for the measurement reporting.

4. A method, comprising:
   determining, by a network device, first re-synchronization signal (RSS) configuration information of a neighbor cell, wherein the first RSS configuration information carries first information that indicates a time domain location of an RSS of the neighbor cell in timing of the neighbor cell; and
   sending the first RSS configuration information,
   wherein the time domain location is determined from a bandwidth limited/coverage enhanced (BL/CE) subframe that is in a frame in which a RSS of the neighbor cell is located and that has a same configuration as a BL/CE subframe of a serving cell as a subframe in which the RSS of the neighbor cell is located.

5. The method according to claim 4, wherein the time domain location comprises the frame in which the RSS of the neighbor cell is located or the subframe in which the RSS of the neighbor cell is located.

6. The method according to claim 4, wherein the method further comprises sending a second RSS configuration information of the neighbor cell, wherein the second RSS configuration information can be used for determining a first frame of the RSS of the neighbor cell.

7. The method according to claim 4, wherein the first information comprises information indicating a target frame in a frame that overlaps with a first frame and that is of the RSS of the neighbor cell in the timing of the neighbor cell;
   wherein the first information indicates the frame in which the RSS of the neighbor cell is located as the target frame; and
   the first frame is a frame of the RSS of the neighbor cell in timing of the serving cell.

8. A communication apparatus, comprising:
   one or more processors in communication with a non-transitory memory storing computer instructions, wherein the instructions, when executed by the one or more processors, cause the apparatus to:
      determine a time domain location according to a first preset rule, wherein the time domain location is a time domain location of a re-synchronization signal (RSS) of a neighbor cell in timing of the neighbor cell;
      determine a first sequence parameter of the RSS of the neighbor cell; and
      measure the RSS of the neighbor cell based on the time domain location and the first sequence parameter of the RSS of the neighbor cell,
   wherein the time domain location comprises a subframe in which the RSS of the neighbor cell is located; and
   wherein the instructions to determine the time domain location according to the first preset rule comprise instructions to determine a bandwidth limited/coverage enhanced (BL/CE) subframe that is in a frame in which the RSS of the neighbor cell is located and that has a same configuration as a BL/CE subframe of a serving cell as the subframe in which the RSS of the neighbor cell is located.

9. The communication apparatus according to claim 8, wherein the time domain location comprises the frame in which the RSS of the neighbor cell is located or the subframe in which the RSS of the neighbor cell is located.

10. The communication apparatus according to claim 8, wherein before the RSS of the neighbor cell is measured, the instructions further cause the communication apparatus to:

receive a second RSS configuration information of the neighbor cell; and determine that a reference signal received quality (RSRQ) in a measurement reporting configuration from a network device is not configured as a reference value for the measurement reporting.

11. A communication apparatus, comprising:

one or more processors in communication with a non-transitory memory storing computer instructions, wherein the instructions, when executed by the one or more processors, cause the apparatus to:

determine first re-synchronization signal (RSS) configuration information of a neighbor cell, wherein the first RSS configuration information carries first information that indicates a time domain location of an RSS of the neighbor cell in timing of the neighbor cell; and causes the first RSS configuration information to be sent, wherein the time domain location is determined from a bandwidth limited/coverage enhanced (BL/CE) subframe that is in a frame in which a RSS of the neighbor cell is located and that has a same configuration as a BL/CE subframe of a serving cell as a subframe in which the RSS of the neighbor cell is located.

12. The communication apparatus according to claim 11, wherein the time domain location comprises the frame in which the RSS of the neighbor cell is located or the subframe in which the RSS of the neighbor cell is located.

13. The communication apparatus according to claim 11, wherein the instructions further cause a second RSS configuration information of the neighbor cell to be sent, wherein the second RSS configuration information can be used for determining a first frame of the RSS of the neighbor cell.

14. The communication apparatus according to claim 11, wherein, when the first information comprises information indicating a target frame in a frame that overlaps with a first frame and that is of the RSS of the neighbor cell in the timing of the neighbor cell, the first information indicates the frame in which the RSS of the neighbor cell is located as the target frame and the first frame is a frame of the RSS of the neighbor cell in timing of the serving cell.

15. The method of claim 1, wherein determining the first sequence parameter of the RSS of the neighbor cell comprises determining the first sequence parameter of the RSS of the neighbor cell according to a second preset rule.

16. The method of claim 15, wherein determining the first sequence parameter of the RSS of the neighbor cell according to a second preset rule comprises determining a first sequence parameter of an RSS of the serving cell as the first sequence parameter of the RSS of the neighbor cell.

17. The method of claim 1, wherein measuring the RSS of the neighbor cell further comprises obtaining a first reference signal received power (RSRP) of the neighbor cell based on a measurement result of measuring the RSS of the neighbor cell.

18. The communication apparatus of claim 8, wherein the instructions to determine the first sequence parameter of the RSS of the neighbor cell comprise instructions to determine the first sequence parameter of the RSS of the neighbor cell according to a second preset rule.

19. The communication apparatus of claim 18, wherein the instructions to determine the first sequence parameter of the RSS of the neighbor cell according to a second preset rule comprise instructions to determine a first sequence parameter of an RSS of the serving cell as the first sequence parameter of the RSS of the neighbor cell.

20. The communication apparatus of claim 8, wherein the instructions to measure the RSS of the neighbor cell further comprise instructions to obtain a first reference signal received power (RSRP) of the neighbor cell based on a measurement result of measuring the RSS of the neighbor cell.

* * * * *